2,930,593
Patented Mar. 29, 1960

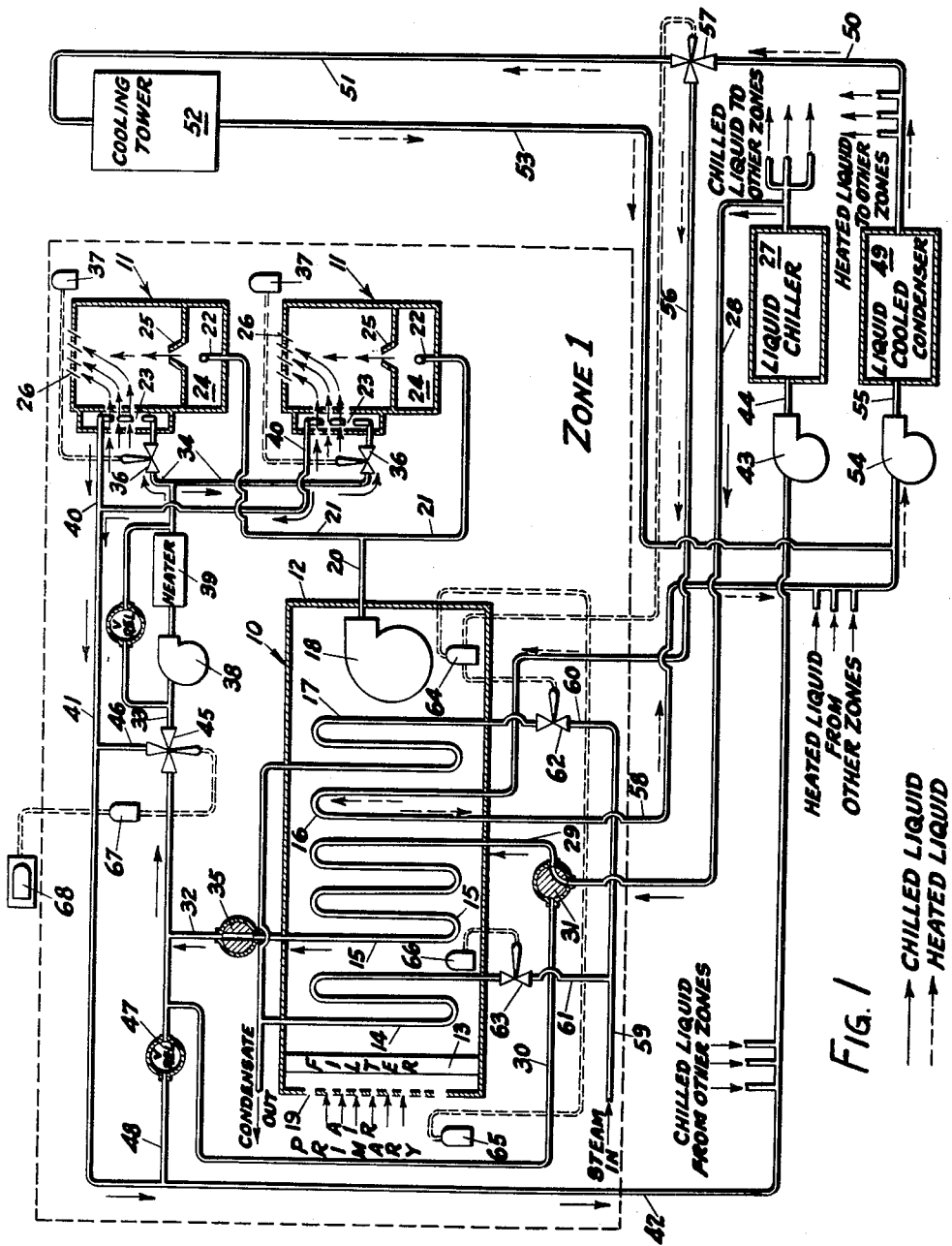

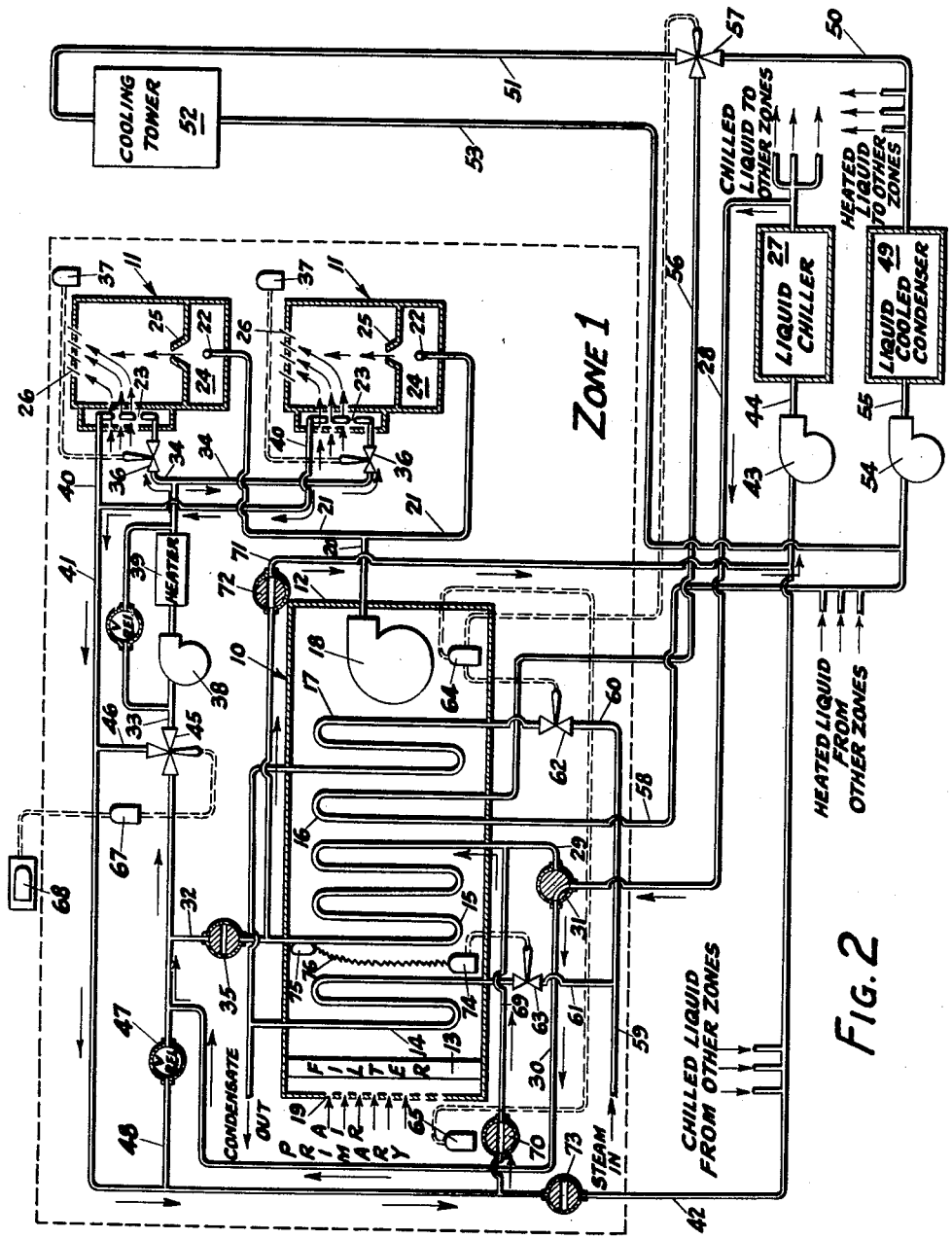

2,930,593
AIR CONDITIONING SYSTEMS

Robert D. Blum, York, Pa., assignor to Borg-Warner Corporation, Chicago, Ill., a corporation of Illinois Application July 5, 1957, Serial No. 670,202

2 Claims. (Cl. 257—283)

This invention relates to air conditioning systems for year-round conditioning of multi-room buildings.

In a typical air conditioning system, and specifically a conventional induction system, induction units are provided in or near the various rooms to be air conditioned. Each unit comprises primarily a heat-exchange coil and a nozzle means. Outside or primary air is treated in a central conditioner and is led to a plenum chamber in the unit. The primary air discharges through the nozzle means at a velocity sufficiently high to induce a flow of room air through the unit. The heat-exchange coil is placed in the path of flow of the room air and thereby effects local conditioning of the room air. The two air streams (primary and room) then merge and are discharged into the room. A heated or chilled heat-exchange fluid, such as water, is circulated through the heat-exchange coil dependent on whether it is desired to add heat to or remove heat from the room air.

The conventional induction system is characterized by three cycles of operation: summer, intermediate and winter.

On the summer cycle, which is that time of the year when the outside temperature is above the temperature it is desired to maintain in the conditioned space, otherwise known as the design temperature, liquid is chilled by a central refrigerating system and this chilled liquid is then circulated through the unit heat-exchange coils. During the summer cycle the coils are designed to take care of the internal sensible heat gain imposed by people, lights, solar effect, etc. The primary air, in addition to providing for ventilation requirements, is conditioned to take care of the sensible heat transmission gain through the wall and glass areas of the conditioned space. The primary air, therefore, will be cooled and dehumidified and supplied to the induction units at a temperature below the design temperature.

When the outside temperature goes below the design temperature, the system shifts into intermediate cycle operation. As in the summer cycle, the coils are designed to take care of the internal sensible heat gain imposed by people, lights, solar effect, etc. and will, therefore, still have chilled liquid circulated therethrough. The primary air is again conditioned in the central conditioner to take care of the sensible heat transmission through the wall and glass areas of the conditioned space. With the outside temperature below the design temperature there will be a sensible heat transmission loss through the wall and glass areas of the conditioned space. The primary air will, therefore, be chilled for dehumidification and slightly reheated to a temperature above the design temperature to compensate for this sensible heat transmission loss. As the outside air temperature drops, the temperature of the primary air is further raised above the design temperature to compensate for the greater sensible heat transmission losses.

It will be apparent, therefore, that on both the summer and intermediate cycles, the unit coils are designed to compensate for the internal sensible heat gain, while the primary air is dehumidified and supplied to the room at a temperature less than or greater than the design temperature, dependent on whether there is a sensible heat transmission gain or loss.

As the outside temperature continues to drop, the "changeover" temperature (generally called "changeover" point) is reached, and the system shifts into the winter cycle of operation wherein the refrigerating system is shut off. Heated liquid is then piped to the various room coils to take care of the sensible heat transmission loss plus the primary air heating load. Primary air is allowed to pass through the conditioner at a minimum temperature of about 40° F. to prevent any possible freezing of liquid coils therein and therefore reaches the rooms at a minimum temperature of about 48° F. (considering all system losses), to take care of any internal sensible heat gain.

It can thus be seen that a conventional system utilizes chilled liquid in the unit coils and dehumidified (hot or cold) primary air for the summer and intermediate cycles and heated liquid in the unit coils and cold primary air for the winter cycle.

The conventional system has a great degree of flexibility because of the fact that on the intermediate cycle, when the outside temperature is below the design point, there is chilled liquid available at the room coil and dehumidified air supplied to the room at a temperature above the design temperature, which allows the system to either heat (no chilled liquid flow through coil) or cool (flow of chilled liquid through the coil). On the winter cycle there is the combination of heated liquid available in the coils and cold primary air supplied to the room allowing the system to cool (no heated liquid flow through coil) or heat (flow of heated liquid through the coil).

The disadvantages of the system are that since the room coil has a chilled liquid supply during the summer and intermediate cycles of operation and a heated liquid supply during the winter cycle, where automatic controls must be used, they become very complex.

In addition, the trend in conventional systems is toward lower and lower "changeover" points, which trend is accelerated by increasing of glass areas in buildings and further efficiency of induction units. Lowering "changeover" points necessitates operating the usual cooling tower in below freezing weather with the consequent difficulties of icing occasioned thereby.

In my application Serial No. 638,962, filed February 2, 1957, I set out a new improved induction system that retained the flexibility of the system as it is now known, but did away with the expense and difficulty of wintersummer unit controls and lower "changeover" points due to the trend to more glass areas. A less adverse effect was occasioned by the increasing efficiency of induction units. Further, the system is characterized by the use of the refrigeration apparatus the year round. Reference may be had to my said application Serial No. 638,962 for a detailed analysis of the disadvantages of the conventional system.

My aforesaid system differs from the conventional system in that chilled liquid is fed year-round to the unit heat-exchange coils to take care of the internal sensible heat gain. The primary air is always conditioned to counteract the sensible heat transmission gain or loss. Once the outside temperature is below the design temperature, there will always be a heat transmission loss and the primary air will always need heat added. The winter cycle is distinguished from the summer and intermediate cycles in that, on the winter cycle, the condenser heat of the refrigerating system, instead of being dissipated in a cooling tower, is utilized in the central conditioner to heat up the incoming primary air. Since chilled liquid is fed year-round to the unit heat-exchange coils, there is no necessity for the summer-winter controls of the conventional system and simple air conditioning controls may be used.

Further, the "changeover" point in my aforesaid system is not so severely affected by the increasing unit efficiencies. The trend to larger glass areas in buildings generally has a beneficial effect, in my system, on the "changeover" point which remains fairly constant and at an elevated temperature. The desirability of a high "changeover" point is based on two factors: (1) the aforementioned cooling tower operation which is difficult and costly in below freezing temperatures and (2) the fact that in my aforesaid system, when on the winter cycle, condenser heat is efficiently utilized to heat incoming primary air rather than being dissipated to the atmosphere. Again, reference may be had to my said application, Serial No. 638,962, for a detailed analysis and discussion of the above. For this purpose, the disclosure of said application may be considered to be a part of this application and incorporated herein.

This application discloses an air conditioning system of the above induction type and is an improvement on my aforesaid system, as disclosed in application Serial No. 638,962. In the system as disclosed herein, I retain all the advantages of my aforesaid system and, in addition, provide two further important advantages. These further advantages are: (1) I maintain completely separate circuits for the chilled liquid and heated condenser liquid flow through the central conditioner which makes for considerably easier maintenance. In my prior application I disclosed a system wherein a common liquid coil was utilized in the central conditioner both for chilled liquid flow and heated condenser liquid flow. (2) Primarily, however, by maintaining such separate circuits, I make it possible to utilize heated condenser liquid for re-heat as soon as the need for re-heating is necessary. It will be apparent that since the primary air is cooled down considerably for dehumidification purposes, it will be often-times necessary to re-heat this air even at outside temperatures above the design temperature. In my prior disclosed system, since the same central conditioner liquid coil was utilized for both chilled liquid and heated condenser liquid flow, I was not able to avail myself of the heated condenser liquid for re-heating purposes until such time as the central conditioner liquid coil was not needed for chilled liquid flow (winter cycle). This meant that during a large portion of the year, condenser heat was dissipated in a cooling tower at the same time that steam or some other source of heat was being utilized to re-heat incoming primary air.

In addition thereto, during those times of the year that the outside air temperature is below the chilled liquid temperature, the normal chilled liquid flow may be reversed, with the chilled liquid flowing first through the unit coils to pick up internal sensible heat and thence through the conditioner chilled liquid coil giving up this heat directly to incoming primary air.

It is, therefore, an object of this invention to provide an improved air conditioning system of the type wherein a chilled liquid is utilized to compensate for internal sensible heat gains within a space to be conditioned and outside or primary air is conditioned to compensate for sensible heat transmission and wherein all heat picked up by the chilled liquid is available for heating the primary air to condition the same as needed.

Yet another object of the invention is to provide an air conditioning system including a plurality of conditioning units, each of said units being located in air communication with a room to be conditioned and said units each including a heat-exchange coil. Primary air is supplied to the rooms and means are provided for flowing room air in heat-exchange relation with the unit heat-exchange coils. A refrigerating system supplies a chilled liquid and means are provided for flowing the chilled liquid first in heat-exchange relation with the primary air and then through the unit heat-exchange coils, or for reversing said flow and flowing the liquid first through the heat-exchange coils and thence in heat-exchange relation with the primary air.

It is still a further object of the invention to provide an air conditioning system including a plurality of conditioning units, each of said units being located in air communication with a room to be conditioned and said units each including a heat-exchange coil. Primary air is supplied to the room and means are provided for flowing room air into the units and through the heat-exchange coils. A refrigerating system supplies a chilled fluid and a heated fluid, the chilled fluid being utilized in the unit heat-exchange coils, and the chilled and heated fluid both being concurrently utilized for treating the primary air prior to its delivery to said rooms.

Another object of the invention is to provide an improved air conditioning system of the type first mentioned including a plurality of induction units located in air communication with rooms to be conditioned, with each unit having a heat-exchange coil and a nozzle. A source of primary outside air including a pair of heat-exchange coils is also provided. Means are provided for connecting the primary air to the nozzles for inducing a flow of room air over the unit heat-exchange coils. Any suitable refrigerating apparatus is utilized for supplying a chilled and heated fluid with connections being provided for connecting the chilled fluid with one of the pair of coils and for connecting the heated fluid with the other of the pair. It is also an object to connect the chilled fluid with the heat-exchange coils in the induction units to provide for any internal sensible heat gain in the rooms to be conditioned. It is more particularly an object to provide means for routing the chilled fluid first through one of the pair of coils and then through the unit coils and for reversing such flow when the outside air temperature drops below the chilled fluid temperature.

The invention consists of the novel constructions, arrangements and devices to be hereinafter described and claimed for carrying out the above-stated objects and such other objects as will appear from the following description of preferred embodiments of the invention described with reference to the accompanying drawings, in which:

Fig. 1 is a diagrammatic representation of an air conditioning system according to the invention; and Fig. 2 is a diagrammatic representation of an air conditioning system as shown in Fig. 1 and including a refinement thereof.

Like numerals refer to like parts throughout the several views.

In conditioning a building according to the invention, the building is divided generally into four zones—north, east, south and west to take due account of the solar effect on any exposure. Since the primary air is conditioned to take care of the sensible heat transmission loss or gain, the units for various rooms making up a zone must be selected on some basis allowing for approximately the same primary air temperature. Turning now to Fig. 1, each zone is provided with a conditioner 10 and a plurality of conditioning units 11, with a unit being in air communication with each space to be conditioned.

Zone conditioner 10 comprises a casing 12 in which is located a filter 13, a preheater 14, a chilled liquid dehumidifying coil 15, a heated liquid coil 16, steam coil 17, and a fan 18 of any convenient type. Fan 18 will be generally of a constant speed type and of sufficient capacity to deliver to all units primary air at the required static pressure to provide for the necessary air velocity at the nozzles to produce the desired induction effect when the air discharges within the units. Air inlet openings 19 are provided in the casing 12 and a discharge conduit 20 serves to connect the fan to several conduits 21 which terminate in discharge openings 22 in the various units.

Only two units have been shown, but it will be appreciated that as many units will be provided as is necessary to serve the zone, with one or more units being in air communication with each room to be conditioned. Each unit contains a chilled liquid coil 23, a plenum chamber 24, an air discharge nozzle 25, and an air outlet 26 from which the air is discharged into the room to be conditioned.

Central refrigerating means are provided for supplying chilled liquid to all the zones at any desired temperature. Any type of refrigerating system with the usual thermostatic controls for maintaining the desired chilled liquid temperature will be provided and includes a liquid chiller 27 in which the liquid may be chilled by any suitable refrigerating medium. An outlet line 28 connects the liquid chiller with the dehumidifying coil 15 via line 29. A bypass line 30 is also provided for bypassing chilled liquid around the dehumidifying coil. Three-way valve 31 interconnects lines 28, 29 and 30 and allows flow of chilled liquid from line 28 to either of lines 29 or 30. From the dehumidifying coil 15, lines 32 and 33 are provided connecting the outlet of the dehumidifying coil to the inlet of the several lines 34 which lead to the coils 23 in the various units. Liquid flow through line 32 is controlled by a valve 35. Suitable valves 36, controlled by simple air conditioning thermostats 37 located in the conditioned spaces, are provided in the various lines 34 for controlling the flow of cold liquid through the heat-exchange coils 23. Conventionally, on a rise in temperature of the conditioned space, thermostats 37 will open valves 36 to allow for the necessary chilled liquid flow through coils 23 to provide the desired cooling.

A pump 38 located in line 33 serves to force the chilled liquid through the various coils 23 to the units. A heater 39 of any suitable type is also provided in line 33 for standby heating when the primary air fan 18 is shut down, as for example, on week ends. Heater 39 will generally have a safety control (not shown) so that it cannot operate when fan 18 is in operation and will be controlled generally by a simple heating thermostat (not shown). Outlet lines 40 lead from the room coils 23 and connect via lines 41 and 42 to the inlet side of a pump 43 and thence through line 44 to the liquid chiller 26.

A distributing valve 45 is connected into line 33 and a line 46 interconnects line 41 and the distributing valve 45 for the purposes to be later explained. A pressure relief valve 47 is provided in line 33 and leads by way of a line 48 into line 41.

A liquid cooled condenser 49 is also provided as part of the refrigerating system and serves to pick up heat rejected by the refrigerating system. The condenser liquid circuit as shown in Fig. 1, comprises lines 50 and 51 which lead to a cooling tower 52, which may be of any conventional type. From the cooling tower 52, line 53 leads to the inlet of a pump 54. A line 55 connects the outlet of the pump to the condenser. This completes the heated condenser liquid cooling tower circuit.

Means are also provided for connecting the condenser to the hot liquid coil 16, to supply condenser water thereto. This takes the form of a line 56, and a distributing valve 57 interconnecting lines 50, 51 and 56 to allow the condenser liquid to flow from line 50 to either of lines 51 and 56 or both. A line 58 serves to lead the condenser liquid from coil 16 back to the inlet of pump 54. It will be thus apparent that heat picked up by the chilled liquid in the unit coils 22 will be rejected by the refrigerating system into the condenser liquid which will become heated thereby. This heat is then rejected into the incoming primary air by the heated condenser liquid flowing through coil 16. The net result is that heat picked up by the chilled liquid in coils 23 is ultimately rejected into the incoming primary air to heat the same when needed.

A steam line 59 serves to conduct steam derived from any suitable source to lines 60 and 61 leading into the steam coil 17 and preheater 14 respectively. Valves 62 and 63 control flow of steam through lines 60 and 61. A master-submaster thermostatic arrangement 64—65, of any well-known type, is provided for controlling the temperature of the air off the reheater 17 according to outside conditions. A two-step thermostat 64 is placed in the leaving air stream and controls valves 57 and 62. Thermostat 64 will divert flow of condenser liquid through valve 57 to allow heated condenser liquid to pass through coil 16 bypassing the cooling tower 52, when heating of the primary air is called for. As valve 57 is fully diverted to allow full flow of condenser liquid through the coil 16, should more heat be required than can be supplied by the full flow of condenser liquid, then thermostat 64 will gradually open valve 62 to admit steam into steam coil 17 to add the additional heat needed so that the temperature of the air will correspond to that called for by thermostat 64. Thermostat 65 is located outside the conditioned space and serves to reset thermostat 64 to provide hotter or colder air as the outside temperature drops or rises respectively. The entire device is so calibrated that the temperature of the air entering the room units will be such that the primary air will provide for sensible heat transmission gains or losses as aforementioned. Since such an arrangement is well known and forms no part of the invention per se, the above description is believed adequate.

A thermostat 66 is provided in the air stream off the preheater 14 to control valve 63 to maintain the entering air temperature at about 40° F. This is necessary to insure that no freeze-up will occur in any of the liquid coils. It will be thus apparent that the preheater will be inoperative until such time as the outside temperature drops below 40° F.

A master-submaster thermostatic arrangement 67—68 is provided for controlling the operation of distributing valve 45.

Turning now to Fig. 1, the chilled and heated liquid flow will be traced: valve 31 will be set as shown and the chilled liquid will flow from liquid chiller 27 via line 28 through valve 31 and line 29 to the chilled liquid coil 15. Valve 35 will be set to allow flow through line 32 and the chilled liquid will then flow from the chilled liquid coil 15 via lines 32 and 33 to the various room coils 23. Should any or all of the valves 36 allowing flow through the various room coils be closed under the influence of thermostats 37, then the pressure relief valve 47 will open bypassing the chilled liquid around the units 11 and back to the inlet of pump 42. This will insure full flow of chilled liquid through the chilled liquid coil 15 at all times, to properly condition the primary air.

Assuming, however, that some cooling is needed, then the various valves 36 will be open under the influence of thermostats 37 and the chilled liquid will flow into line 32 and thence into line 33 under influence of pump 38 and then into the room coils 23. The chilled liquid leaves the room coils through the lines 40 which merge into line 41 for return to the water chiller 27.

Even though the chilled liquid will leave the liquid chiller 27 at a fixed temperature, this temperature will vary out of chilled liquid coil 15 dependent on the temperature of the air passing over the coil. In order to maintain a desired temperature of liquid available at the room coils, distributing valve 45 will allow some of the liquid leaving the unit coils 23, which has been slightly warmed, to flow through line 46 and into line 33 wherein it mixes with the chilled liquid therein should the temperature of the chilled liquid be lower than desirable. Distributing valve 45 is controlled by submaster thermostat 67 which, in turn, is set by master thermostat 68, the two being similar in operation to the arrangement which controls the primary air temperature. Preferably the master thermostat is of the type known as a "Solar Compensator," as manufactured by the Minneapolis-Honeywell Regulator Company, which is placed outside the building in a position where it responds to the solar effect in addition to the outside air temperature. The temperature of the chilled liquid en route to the room coils 23 is thereby regulated to accurately reflect the need for cooling.

The heated condenser liquid, during such period of time that no heat need be added to the primary air, flows via lines 50 and 51 into cooling tower 52. Valve 59 is, of course, of the type that will in its normal position allow flow between the two lines. The liquid gives up its heat in the cooling tower 52 and then flows via line 53 back to condenser 49.

Primary or outside air entering the unit conditioner 10 will be filtered, cooled and dehumidified by the chilled liquid in coil 15 and delivered by fan 18 to the various units. The temperature of the air will be controlled to compensate for any sensible heat transmission. As soon as internal sensible heat gains in the form of people, lights, solar effect, etc. is introduced into any space, then the appropriate thermostat 37 will open the corresponding valve 36 to provide the additional cooling needed.

As soon as the outside temperature drops to a point where re-heating of the primary air is needed, thermostat 64 will actuate valve 57 to allow for a partial flow of heated condenser liquid to flow through heated liquid coil 16 for this purpose. It will be apparent that as the outside temperature continues to drop, and especially when it drops below the design point and the incoming primary air is then utilized to compensate for heat transmission losses, that valve 57 will be diverted to allow greater and greater flow through heated coil 16.

At such times as the outside temperature drops to a point sufficiently low that all the heated condenser liquid is utilized in the heated liquid coils 16 of the various zones, then the cooling tower will be shut down and the system will then be operating on its winter cycle. Should the outside temperature continue to drop and more heating needed than can be supplied by the heated condenser liquid, then thermostat 64 will begin to open valve 62 to allow flow of steam into steam coil 17 to provide this additional heat.

It will be appreciated that one zone is completely independent of any other, with the only common apparatus being the central refrigerating system which supplies heated and chilled liquid to all zones. It will be apparent, also, that the cumulative heating requirements of several zones will generally be required before such time that the full flow of heated condenser liquid is utilized in the various coils 16 allowing the cooling tower 52 to be shut down. Further, the number of zones generally varies from building to building with each zone's operation being unaffected by another zone's operation.

At such time as the outside temperature drops below the maintained temperature of the chilled liquid, it will be apparent that it will no longer be necessary to pass such liquid through chilled liquid coil 15. Under such circumstances, valve 31 will be actuated to a position wherein it connects lines 28 and 30 and the chilled liquid will then bypass chilled liquid coil 15 and flow directly into line 33 and thence into the individual room coils 23.

Heat picked up by the chilled liquid flowing through room coils 23 is transferred to the incoming primary air via the refrigerating system disclosed. However, at such time when there is no chilled liquid flow through coil 15, as aforementioned, it can be seen that liquid flow leaving coils 23 might be reversed through the coil 15 with the liquid giving up the heat picked up directly to the incoming primary air. This system is shown in Fig. 2.

Turning now to Fig. 2, a system is provided that is practically identical to the Fig. 1 system, but includes in addition thereto a line 69 connecting line 42 with coil 15. A valve 70 controls flow through line 69. An additional line 71 having a valve 72 therein is connected between coil 15 and line 42. A valve 73 is provided in line 42 intermediate the juncture of lines 69 and 71 therewith. Finally, thermostat 66 is replaced by a thermostat 74 of the type which responds to the temperature of a liquid. The liquid temperature within coil 15 is sensed by a bulb 75 connected to thermostat 74 by way of the customary capillary 76; the entire device is filled with a suitable heat-exchange fluid, all as is well known in the art.

At such times as the outside temperature drops below the chilled liquid temperature, the chilled liquid is diverted about coil 15, flowing directly to the heat-exchange coils 23. Valves 70, 72 and 73 are set as shown in Fig. 2 and the chilled liquid (slightly warmed in its passage through room coils 23) flows through line 41 en route from the heat-exchange coils 23 and then through line 69 into coil 15 wherein it will give up a portion of the heat picked up in coils 23 directly to the incoming primary air. The chilled liquid will exit coil 15 and then flow through line 71 into line 42 and the inlet of pump 43, all as shown by the solid line arrows. Pressure relief valve 47 again functions to bypass liquid around units 11, assuming closed valves 36, allowing full flow through coil 15.

During this period of the year when coil 15 is being bypassed, the flow of heated liquid is identical to the Fig. 1 system. Part of the heated liquid flows through coil 16 and part through cooling tower 52. When the outside temperature is such that the entire flow of heated liquid can be diverted through the various zone coils 16, then the cooling tower 52 is shut down.

It will be apparent that as the outside air temperature drops, there will be a progressively greater heat-exchange between it and the liquid within coil 15. Should pre-heater 14 be controlled in the same fashion as in the Fig. 1 system to maintain the entering air temperature no lower than 40° F., it will be apparent that this would be a definite limit to the amount of heat exchanged between liquid and air. In order to avoid this, and since the primary purpose of pre-heater 14 is to prevent any freeze-ups in chilled liquid coil 15 (since heated liquid flows through coil 16 there is no danger of freeze-ups therein), thermostat 74 is set to maintain a predetermined liquid temperature of about 34° F. Should the liquid temperature drop below 34° F. or whatever temperature is thought to be desirable in order to prevent freeze-ups, then valve 63 will be progressively opened under the influence of thermostat 74 to allow flow of steam through pre-heater 14 to maintain this temperature. This will insure that no freeze-ups will occur in coil 15 and at the same time it will be possible for the entering air temperature to be considerably below 32° F. and often as low as 0° F.

At such times of the year when the outside temperature is above the chilled liquid temperature, both the chilled liquid flow and the heated liquid flow will be identical to the Fig. 1 system. For this purpose, valve 70 will be in its closed position shutting off flow through line 69, valve 72 will be in its closed position shutting off flow through line 71, and valve 73 will be in its open position allowing flow through line 42.

I wish it to be understood that my invention is not to be limited to the specific constructions and arrangements shown and described except only insofar as the claims may be so limited, as it will be apparent to those skilled in the art that changes may be made without departing from the principles of the invention.

What is claimed is:

1. An air conditioning system for multi-room buildings comprising a plurality of heat-exchange coils in air communication with respective rooms; means for delivering primary air to said rooms; means for flowing room air over said coils in heat-exchange relation therewith; conditioning means for treating said primary air and including a chilled liquid coil and a heated liquid coil; a refrigeration system providing a chilled liquid and a heated liquid; means for supplying said chilled liquid to said room heat-exchange coils and to said chilled liquid coil; means for supplying said heated liquid to said heated liquid coil; means for routing said chilled liquid first through said chilled liquid coil and then through said heat-exchange coils; and means for reversing said flow.

2. An air conditioning system for multi-room buildings comprising a plurality of heat-exchange coils in air communication with respective rooms; means for delivering primary air to said rooms; means for flowing room air over said coils in heat-exchange relation therewith; refrigerating means for supplying a chilled liquid and including a refrigerant condenser for supplying a heated liquid; means for conditioning said primary air and including a chilled liquid coil and a heated liquid coil; means for connecting said chilled liquid with said first-named coils; means for supplying said chilled liquid to said chilled liquid coil for cooling and dehumidifying said primary air; means for supplying said heated liquid to said heated liquid coil for re-heating said outside air; means for flowing said chilled liquid first through said chilled liquid coil and then through said heat-exchange coils; and means for reversing said flow.

References Cited in the file of this patent

UNITED STATES PATENTS

| | | |
|---|---|---|
| 1,969,187 | Schutt | Aug. 7, 1934 |
| 2,100,110 | Smith et al. | Nov. 23, 1937 |
| 2,100,867 | Olson | Nov. 30, 1937 |
| 2,150,224 | Hull | Mar. 14, 1939 |
| 2,219,815 | Jones | Oct. 29, 1940 |
| 2,363,294 | Carrier | Nov. 21, 1944 |